US012769919B2

(12) United States Patent
Bulusu et al.

(10) Patent No.: US 12,769,919 B2
(45) Date of Patent: Oct. 20, 2026

(54) METHOD AND SYSTEM FOR AGING AWARE MODELING AND STATIC TIMING ANALYSIS OF CIRCUITS

(71) Applicants: Indian Institute of Technology Roorkee, Roorkee (IN); Texas Instruments Incorporated, Dallas, TX (US)

(72) Inventors: Anand Bulusu, Roorkee (IN); Sudeb Dasgupta, Roorkee (IN); Lomash Chandra Acharya, Roorkee (IN); Sai Shabarish Nayakanti, Roorkee (IN); Ajoy Mandal, Bangalore (IN); Venkatraman Ramakrishnan, Bangalore (IN)

(73) Assignees: Indian Institute of Technology Roorkee, Roorkee (IN); Texas Instruments Incorporated, Dallas, TX (US)

( * ) Notice: Subject to any disclaimer, the term of this patent is extended or adjusted under 35 U.S.C. 154(b) by 841 days.

(21) Appl. No.: 18/128,381

(22) Filed: Mar. 30, 2023

(65) Prior Publication Data

US 2024/0330555 A1 Oct. 3, 2024

(51) Int. Cl.
*G06F 30/367* (2020.01)
*G06F 119/12* (2020.01)

(52) U.S. Cl.
CPC ........ *G06F 30/367* (2020.01); *G06F 2119/12* (2020.01)

(58) Field of Classification Search
CPC . G06F 2119/12; G06F 30/367; G06F 30/3312
See application file for complete search history.

(56) References Cited

U.S. PATENT DOCUMENTS

2013/0254731 A1* 9/2013 Bansal ................ G06F 30/3312 716/113
2020/0019663 A1* 1/2020 Pittu ...................... H03K 19/20

* cited by examiner

*Primary Examiner* — Jack Chiang
*Assistant Examiner* — Rayappu Soundranayagam
(74) *Attorney, Agent, or Firm* — Withrow & Terranova, PLLC

(57) ABSTRACT

Various embodiments provide for an aging-aware modeling and static timing analysis method and system that uses a Switching Activity Factor-based Effective Current Source Model to estimate the timing performance of circuit blocks. First, a variation-aware timing model of stacked and multistage standard cells relating the model coefficient with device-level variations (including $V_{th}$) to reduce recharacterization efforts is developed. Then a Process Design Kit (PDK)-specific approach for estimating $V_{th}$ degradation in different stress conditions of a transistor such as static, dynamic, and asymmetric stress conditions is proposed. Then a circuit topology-specific approach utilizing a methodology for the propagation of switching activity factor ($\alpha$) in a data path circuit having N-stacked and N-parallel logic is proposed.

20 Claims, 12 Drawing Sheets

METHOD AND SYSTEM FOR AGING AWARE MODELING AND STATIC TIMING ANALYSIS OF CIRCUITS

FIELD OF THE DISCLOSURE

The present disclosure relates to a switching activity aware aging modeling and static timing analysis method and system that uses a Switching Activity Factor-based Effective Current Source Model to estimate the timing performance of circuits.

BACKGROUND

In the current era of nanometer CMOS technology, Static Timing Analysis (STA) tools select delay information associated with a standard cell library component from precompiled standard cell library characterized by data for a combination of input transition time ($T_R$) and load capacitance ($C_L$). Different timing models are utilized in this context for standard cell characterization. The non-linear delay model (NLDM) has effectively been used for standard cell characterization at technology nodes up to 90 nm. As the technology node scales below 90 nm, NLDM encounters inaccurate delay values due to process variations, Miller Effect, Interconnect Coupling, and Short Channel Effect. To overcome the bottleneck of NLDM, an Effective Current Source Model (ECSM) is introduced as circuit block characterization technique. For example, in a standard cell library, the delay information is stored in standard library format.

Temporal variability mechanisms (aging) such as Bias Temperature Instability (BTI) and Hot Carrier Injection (HCI) effects degrade the timing performance of any circuit block due to a gradual shift in the $V_{th}$ shift of the MOS device. In real-time applications, when circuit block or any topology of transistors is initially stressed at a high level of voltage and temperature stress and subsequently operated at lower levels of stress, the timing performance of the circuit block degrades more severely. This degradation in timing performance of an individual circuit block results in the conversion of a non/near-critical path into a critical one when placed in a data path circuit. Therefore, understanding the influence of aging on circuit block library data is critical for evaluating the impact of aging on digital timing closure.

There are several different strategies for generating aging-aware circuit block library data. Existing work is divided into three main categories. The first category of work achieves good accuracy using full-circuit transistor-level Simulation Program with Integrated Circuit Emphasis (SPICE) simulation but comes with the disadvantage of slow speed. The second type of work utilizes a lookup table (LUT)-based gate-level models with linear interpolation to achieve better speed at reduced accuracy. In the final category of study, machine learning techniques or an artificial neural network-based strategy are used to anticipate the delay caused by the aging effect at the gate level. The work recommended in the third category listed above is based on NLDM, which is highly unreliable in predicting delay below 90 nm technology node. The delay information in circuit block characterization data varies with device/layout level variations such as cell driving strength (W), threshold voltage ($V_{th}$), mobility ($\mu$), temperature (T), number of fingers (NF) in layout, and aging-related parameters such as stress time (t) and switching activity factor or duty cycle ($\alpha$). None of the available approaches can cover all device/layout and aging-related characteristics including temporal variations and process voltage temperature (PVT) dependence that impact circuit block characterization data.

Due to limitation of existing methods based on Look-up tables from SPICE simulations and analysis methods based on RC delay introduce high level of inaccuracy in delay prediction.

SUMMARY

Various embodiments provide for an aging-aware modeling and static timing analysis method and system that uses a Switching Activity Factor-based Effective Current Source Model to estimate the timing performance of circuit blocks. First, a variation-aware timing model of stacked and multistage standard cells relating the model coefficient with device-level variations (including $V_{th}$) to reduce recharacterization efforts is developed. Then a Process Design Kit (PDK)-specific approach for estimating $V_{th}$ degradation in different stress conditions of a transistor such as static, dynamic, and asymmetric stress conditions is proposed. Then a circuit topology-specific approach utilizing a methodology for the propagation of switching activity factor ($\alpha$) in a data path circuit having N-stacked and N-parallel logic is proposed.

In another embodiment, a method for estimating a timing performance of a digital circuit is provided. The method includes determining a timing model for one or more circuit components based on threshold crossing points for each circuit component in a circuit block. The method includes determining model coefficients for the timing model for each of the one or more circuit components based on a circuit simulation. The method includes determining a timing performance of the circuit block by combining timing models of logic stages with a propagation of an output transition time of a successive stage as the input transition time of a next stage. The method includes estimating an aging related threshold voltage degradation based on a stress simulation of a transistor. The method includes updating the model coefficients based on the aging related threshold voltage degradation, wherein the updating the model coefficients results in an updated aging aware timing model for the one or more circuit components. The method includes updating the timing model for aging related degradation in stacked transistors in a multi-stack circuit. The method includes determining an aging stress effect propagation through the one or more circuit components in the circuit block. The method includes updating the timing model for multiple stages of transistors of the circuit component based on the aging stress effect propagation. The method includes determining an aging aware timing performance of the circuit block by based on the aging aware timing model of the one or more circuit components in the circuit block. The method includes performing a signal processing operation based on the aging aware timing model.

In another embodiment, a system for estimating a timing performance of a digital circuit is provided that includes a memory that comprises computer-executable instructions and a processor that executes the computer-executable instructions to perform operations. The operations include determining a timing model for one or more circuit components based on threshold crossing points for each circuit component in a circuit block. The operations include determining model coefficients for the timing model for each of the one or more circuit components based on a circuit simulation. The operations include determining a timing performance of the circuit block by combining timing models of logic stages with a propagation of an output transition time of a successive stage as the input transition time of a next stage. The operations include estimating an aging related threshold voltage degradation based on a stress simulation of a transistor. The operations include updating the model coefficients based on the aging related threshold voltage degradation, wherein the updating the model coefficients results in an updated aging aware timing model for the one or more circuit components. The operations include updating the timing model for aging related degradation in stacked transistors in a multi-stack circuit. The operations include determining an aging stress effect propagation through the one or more circuit components in the circuit block. The operations include updating the timing model for multiple stages of transistors of the circuit component based on the aging stress effect propagation. The operations include determining an aging aware timing performance of the circuit block by based on the aging aware timing model of the one or more circuit components in the circuit block. The operations include performing a signal processing operation based on the aging aware timing model.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 illustrates a high-level approach for developing variation aware timing models according to one or more embodiments of the present disclosure.

FIGS. 2A, 2B, and 2C illustrate NOR gate schematics with node voltage transitions according to one or more embodiments of the present disclosure.

DETAILED DESCRIPTION

Figure 1:
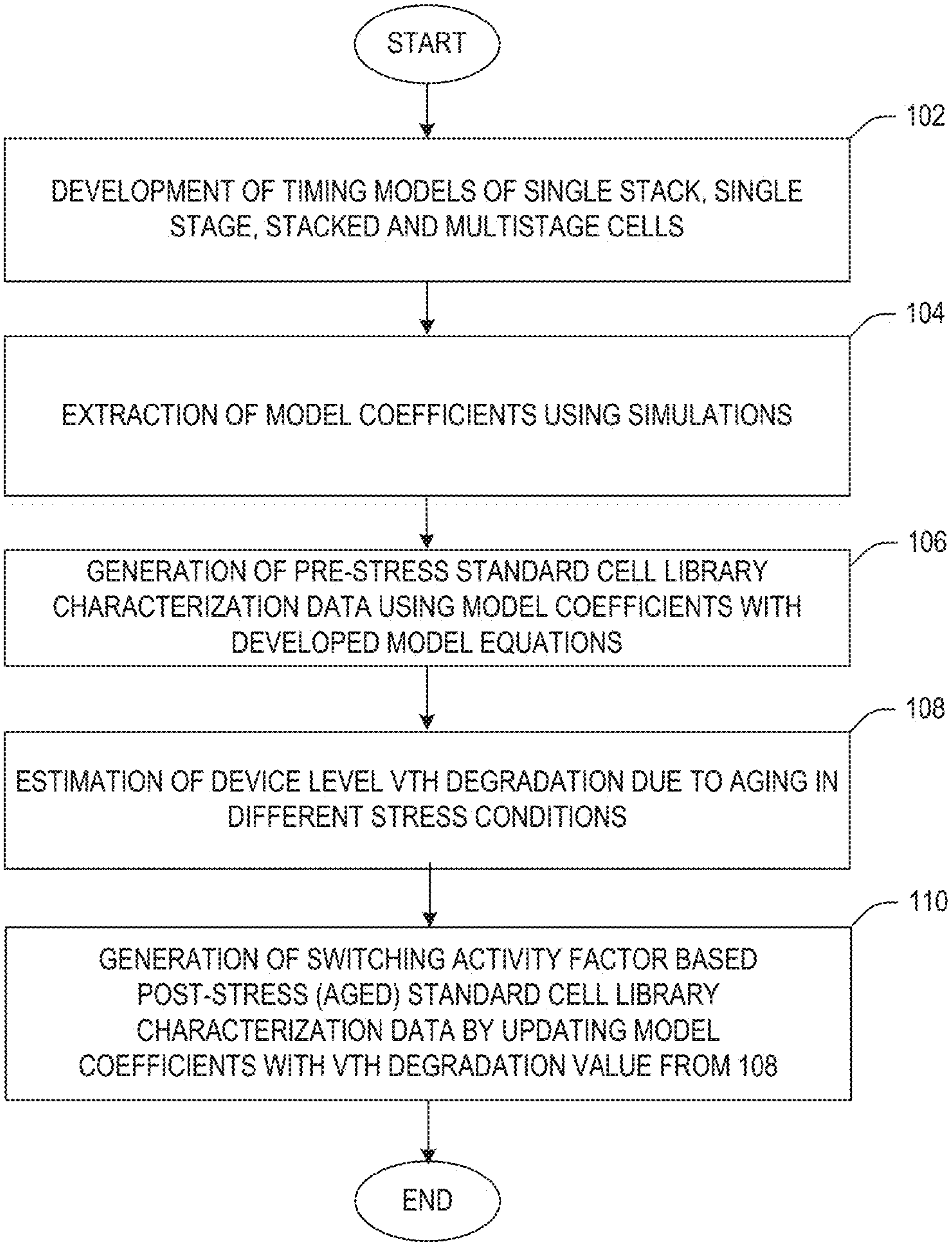

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

Various embodiments provide for an aging-aware static timing analysis (STA) method and system that uses a Switching Activity Factor-based Effective Current Source Model (SAFE) to estimate the timing performance of digital circuits. First, a variation-aware timing model of stacked and multistage standard cells relating the model coefficient with device-level variations (including $V_{th}$) to reduce recharacterization efforts is developed. An approach based on one-time stress simulation on an individual MOS device is developed for estimating $V_{th}$ [applicable to any given CMOS process design kit (PDK)] in different stress conditions such as static, dynamic, and asymmetric in following two steps:

a) Extraction of the aging related parameters of the given PDK by curve-fitting of empirical relation of threshold voltage degradation on stress simulation data of an individual MOS device.
b) For asymmetric aging (in multistacked and multistage logic, value of the switching activity factor ($\alpha$) at intermediate nodes is different from the value of the $\alpha$ applied at primary input side results into different amount of threshold voltage degradation in different devices in a path), methodology development to predict effective value of switching activity factor ($\alpha$) in a data path circuit having N-stacked and N-parallel logic.

FIG. 1 illustrates a high-level approach for developing variation aware timing models. In FIG. 1, first development of timing models of single stack, single stage, stacked and multistage cells is performed at 102. Then at 104, model coefficients are extracted using simulations. Then at 106, pre-stress standard cell library characterization data is generated using model coefficients with developed model equations, and then at 108, device level $V_{th}$ degradation is estimated due to aging in different stress conditions. Then, at 110, switching activity factor-based post stress standard cell library characterization data is generated by updating the model coefficients with $V_{th}$ degradation values from the previous estimation.

The proposed methodology is based on developing device-level variation aware analytical timing models of stacked and multistage logic cells such as NAND, NOR, AND, and OR gates These are merely exemplary logic cells, and the present disclosure can be applicable to any topology of transistors and analog or digital circuits. The timing performance of a circuit block degrades with threshold voltage ($V_{th}$) degradation in MOS devices due to aging mechanisms like bias temperature instability (BTI) and hot carrier injection (HCI). However, SAFE makes the whole STA process aging aware by updating model coefficients with $V_{th}$ degradation due to NBTI. It is achieved by proposing an approach [applicable to any process design kit (PDK)] for estimating $V_{th}$ degradation under various stress circumstances, including static, dynamic, and asymmetric. In asymmetric aging, propagation of effective switching activity factor ($\alpha_{eff}$) at intermediate nodes is different from the applied duty cycle ($\alpha$) at the primary inputs. Therefore, $\alpha_{eff}$ is identified for N-stage stacked and N-stage parallel logic to develop a methodology for the propagation of $\alpha$ in data path circuits. In an exemplary embodiment, a python-based tool is developed to estimate delay degradation in a data path. In an exemplary embodiment, the entire simulation process can be performed using Mentor Graphics Eldo Simulation Program with Integrated Circuit Emphasis (SPICE) simulator in a 65 nm CMOS process in its STMicroelectronics environment. The present disclosure's SAFE approach provides simulation accuracy with an average error so far as what has been assessed of 2.5% with respect to the standard SPICE simulations. This is not an absolute average, just a current assessment. Finally, as compared to the SPICE/Stress simulation, the present disclosure's proposed SAFE model yields, so far, a remarkable reduction of ~97.66%.

As an example, the timing models for stacked logic [time instance of output node charge/discharge known as threshold crossing points (TCPs)] for NOR gates is described below. There are two cases in the NOR gate, and each case has two models.

Figure 2A:
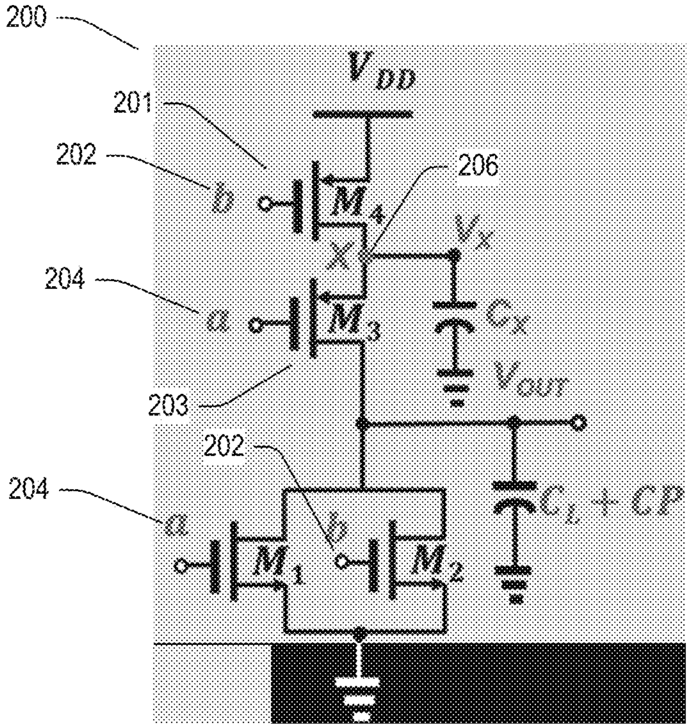
Figure 2B:
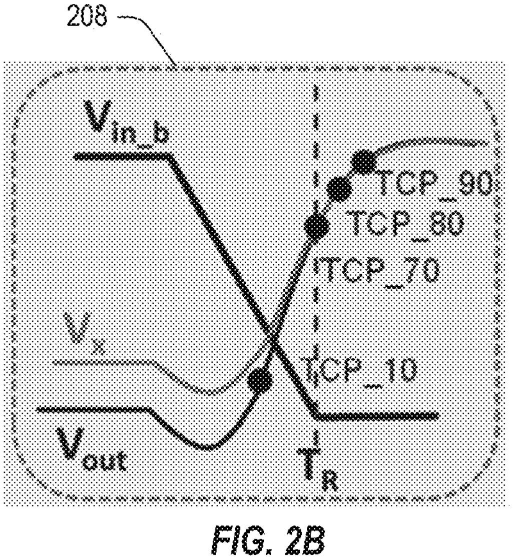
Figure 2C:
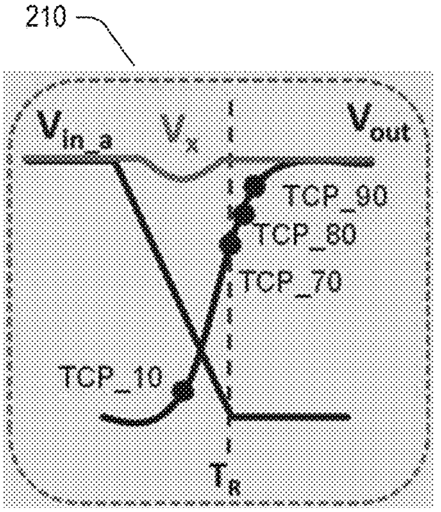

A. Case I: When an upper transistor in series-stack switches
B. Case II: When a lower transistor in series-stack switches FIG. 2A illustrates exemplary NOR gate 200 schematics with node voltage transitions according to an embodiment of the present disclosure. Graph 208 in FIG. 2B illustrates threshold crossing points of output node charge/discharge as measured at node x 206 when B 202 makes a transition. Graph 210 in FIG. 2C illustrates threshold crossing points of output node charge/discharge as measured at node x 206 when A 204 makes a transition.

Case I: When an Upper Transistor in Series-Stack Switches

Figure 3A:
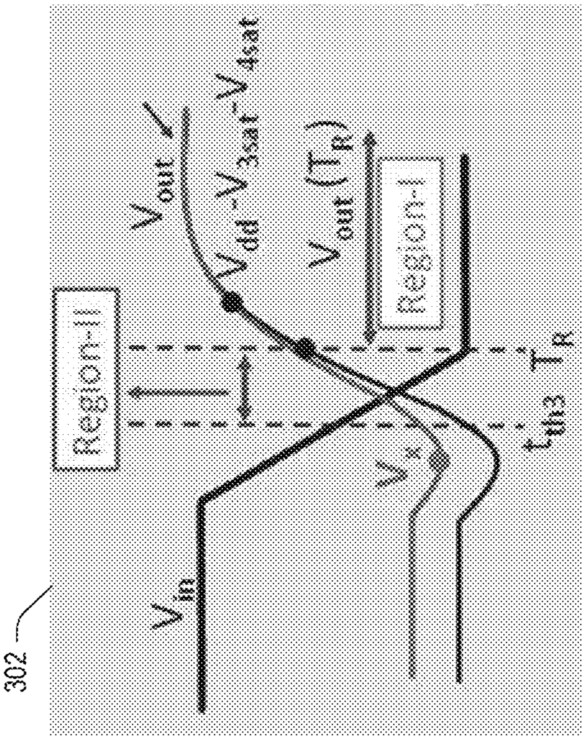
FIGS. 3A and 3B illustrate NOR gate timing models with node transitions according to one or more embodiments of the present disclosure.
Figure 3B:
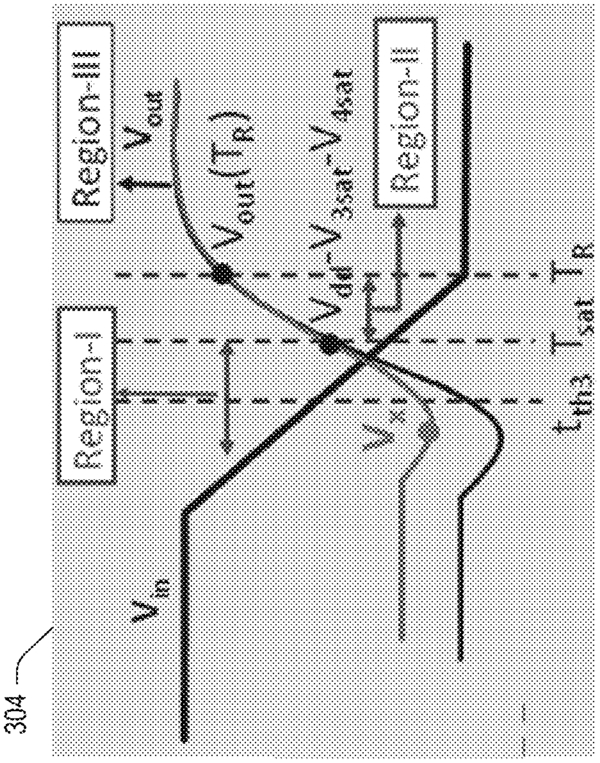

The details of input, output, and intermediate node transition for exemplary two models for case I ($V_{in\text{-}b}$ at gate of $M_4$) are shown in FIGS. 3A and 3B. The model 302 in FIG. 3A corresponds for small $T_R$ and a large $C_L$, while the model 304 in FIG. 3B corresponds to large $T_R$ and a small $C_L$.

To obtain TCPs of a NOR gate in standard ECSM syntax, the voltage transition of the intermediate node X 206 in different regions is first modeled as indicated with the Region prefix in FIGS. 3A and 3B. In Region-I, $M_3$ is in an off state due to a lower value of $V_X$, so by solving KCL at node X 206 gives the value of the point $t_0$ at which $dV_X/dt=0$:

$$t_0 = \frac{(|V_{th4}| + |V_{4sat}|)}{V_{dd}} T_R + \frac{C_M}{\beta s_{M_4}} \quad \text{Eqn. 1}$$

In Eqn 1 above, $V_{4sat}$ is the voltage at $T_{sat}$ shown in FIG. 3B and $\beta_{SM4}$ is given by $W_4C_{OX}V_{sat4}(1+\lambda V_{dav})$. In Region-II, 302 in FIG. 3A, the currents from $M_4$ and $V_{in-b}$ are coming towards node X 206 and traveling towards $C_X$ from node X, hence using KCL at node X 206, one gets:

$$V_x(t) = \frac{\beta_{SM_4} V_{dd}}{2(C_M + C_x)} \frac{t^2}{T_R} - \frac{\beta_{SM_4} V_{dd}}{(C_M + C_x)T_R} t_0 t + c \quad \text{Eqn. 2}$$

The value of c is calculated at $t=t_0[V_X(t)=V_X(t_0)]$. Hence, by solving obtained is the following:

$$V_x(t) = \frac{\beta_{SM_4} V_{dd}(t - t_0)^2}{2T_R(C_M + C_x)} + V_x(t_0) \quad \text{Eqn. 3}$$

In R-2, at a specific time instance $t_{th3}$, when node voltage $V_X$ rises to a certain value, $M_3$ starts conduction, and the value of $t_{th\ 3}$ is:

$$t_{th3} = t_0 + \sqrt{\frac{2T_R(C_M + C_x)(V_x(t_{th3}) - V_x(t_0))}{\beta_{sM_4} V_{dd}}} \quad \text{Eqn. 4}$$

Again, in Region-III, the change in $V_X$ is equal and opposite to $V_{in-b}$, hence by solving KCL at node X, one gets:

$$V_x = \frac{\beta_{SM_4}}{\beta_{SM_3}} V_{dd} \frac{t}{T_R} \quad \text{Eqn. 5}$$

Finally, $V_X$ reaches a high constant value, as shown below:

$$V_x = V_{xconst} \quad \text{Eqn. 6}$$

Figure 5A:
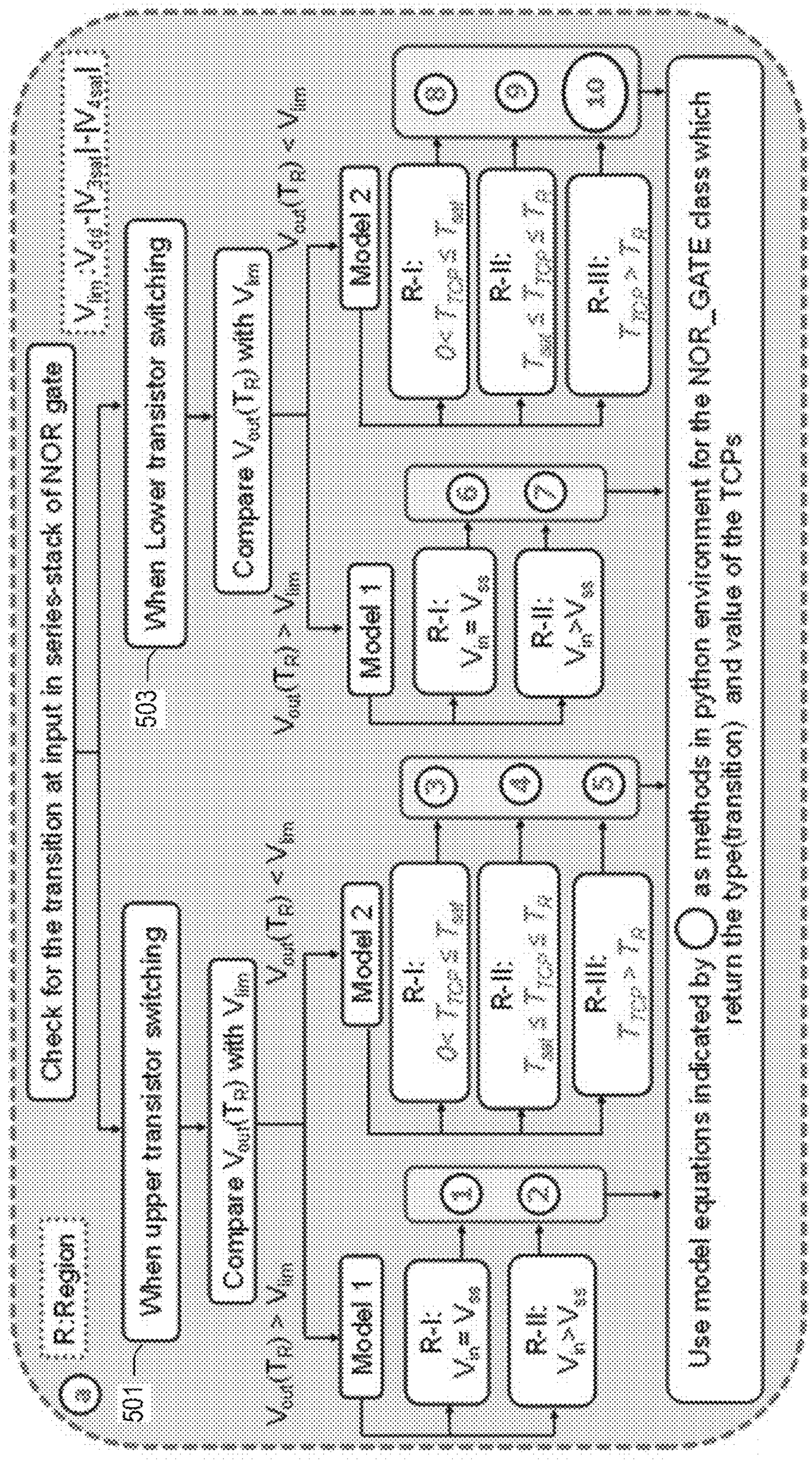
FIG. 5A illustrates NOR gate model equations according to one or more embodiments of the present disclosure.
Figure 5B:
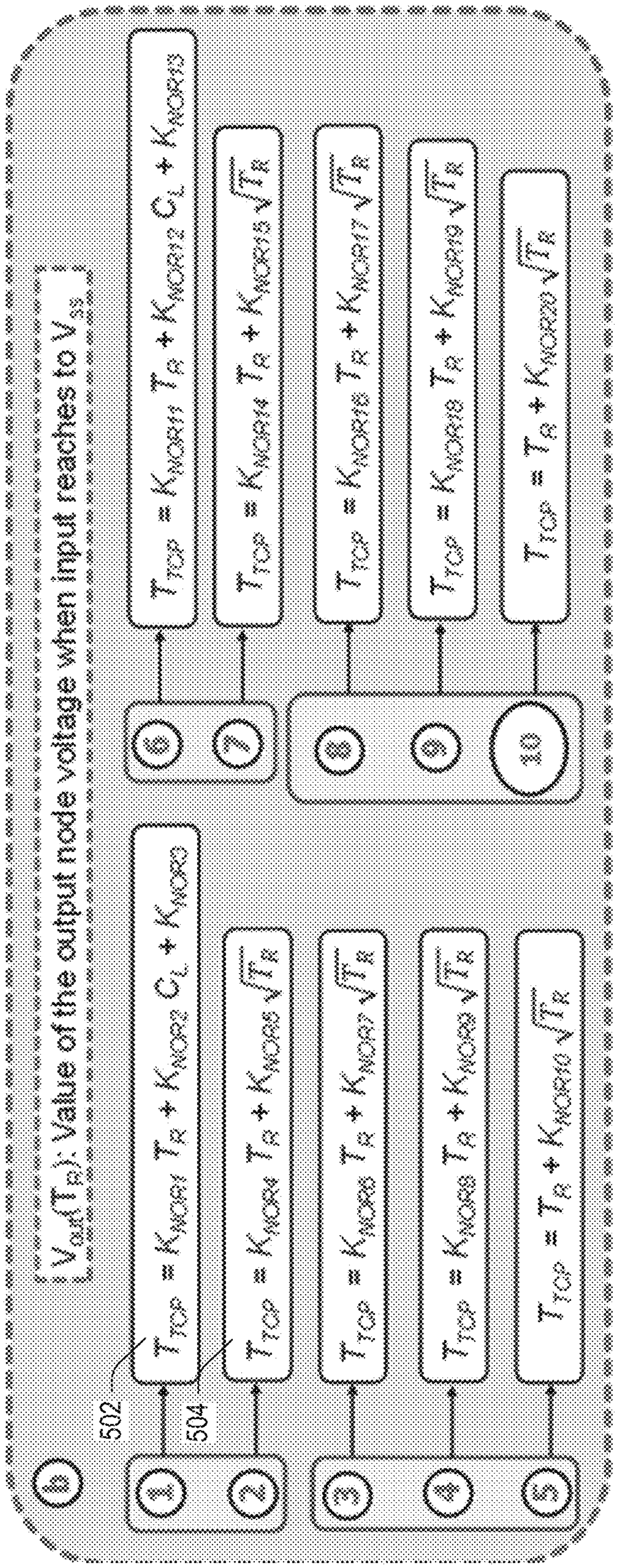
FIG. 5B illustrates NOR gate model coefficients according to one or more embodiments of the present disclosure.

Now, based on the value of $t_{th3}$ and $V_X$, KCL is used with the terminal transition of $M_3$ to calculate TCPs of the output node in different regions, as shown in FIG. 5B.

Case II: When the Lower Transistor in Series-Stack Switches

Figure 4B:
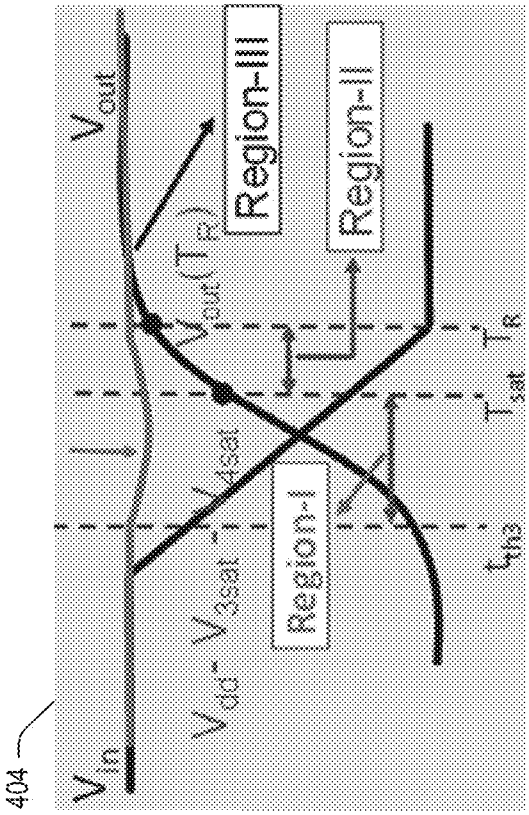
FIGS. 4A and 4B illustrate another example of NOR gate timing models with node transitions according to one or more embodiments of the present disclosure.
Figure 4A:
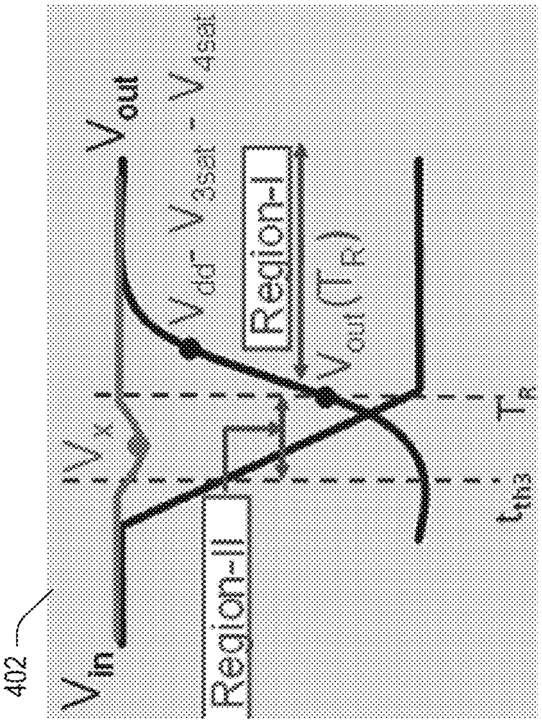

Here, the steps to calculate TCPs are similar to the case I, only the variation of voltage $V_X$ is different, as shown in graphs 402 and 404 in FIGS. 4A and 4B, respectively. Thus model $V_X$ variation is first modeled and then apply the same approach to calculate TCPs values for case II. In this case, it is observed that voltage $V_X$ first linearly falls till it reaches $dV_X/dt=0$, then it rises, indicating that the value of $I_{M4}$ is equal to the value of $I_{M3}$ and the rate of change of $dV_{in-a}/dt$ is balanced out by $dV_X/dt$; hence we derive $V_X$ for R-1 and R-2 region as shown below:

$$V_x(t) = \frac{-C_M}{(C_M + C_x)} \frac{V_{dd}}{T_R} t \text{ for falling } V_X \text{ in the } R-1 \text{ region} \quad \text{Eqn. 7}$$

-continued $$V_x(t) = \frac{C_M}{(C_M + C_x)} \frac{V_{dd}}{T_R} t \text{ for rising } V_X \text{ in the } R-2 \text{ region} \quad \text{Eqn. 8}$$

Now, based on the value of $V_X$, linear circuit theory is used with the terminal transition of $M_3$ to calculate TCPs of output nodes in different regions, as shown in FIGS. 5A and 5B. FIG. 5A includes NOR gate model equations and flowcharts that depicts flow chart 501 when the upper transistor 201 switches and flow chart 503 when the lower transistor 203 switches. While FIG. 5B includes the associated model coefficients. The model coefficients (e.g., 502, 504, etc.) as a function of device/layout level parameters can be extracted by curve fitting of the model equation on SPICE simulation data of a NOR gate. The models of the NAND gate will be the dual of NOR gate. Therefore, case I of NOR gate is case II of NAND gate and vice-versa.

Figure 6:
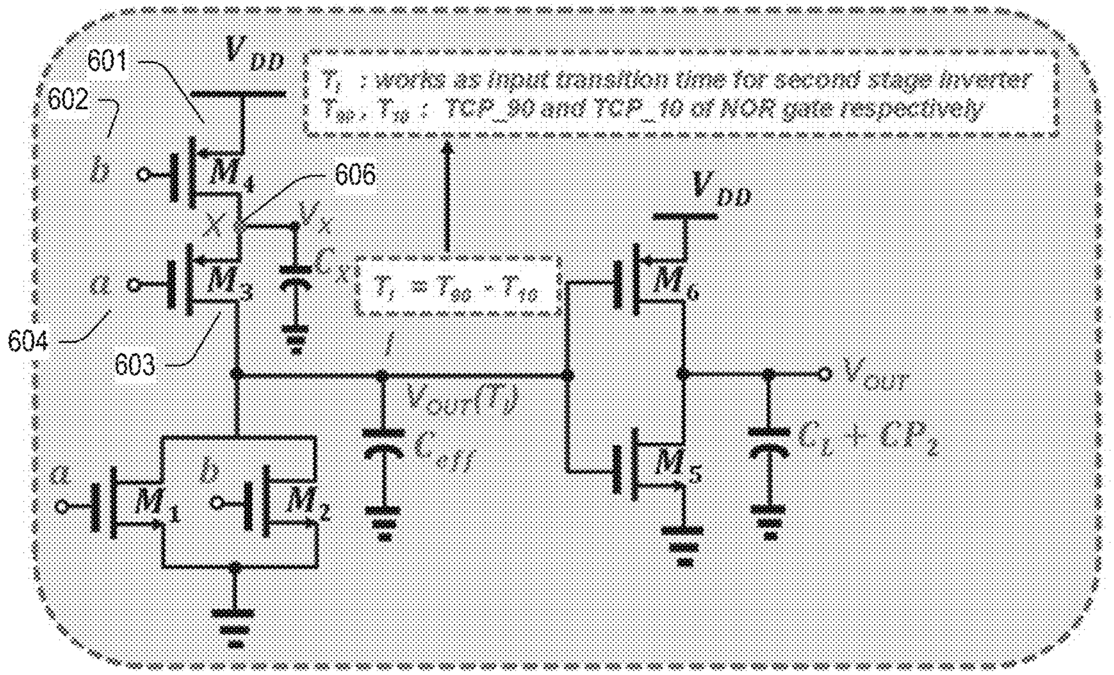
FIG. 6 illustrates OR gate schematics with node voltage transitions according to one or more embodiments of the present disclosure.

FIG. 6 illustrates an OR gate schematic with node voltage transitions. OR gate models are the dual of the AND gate model. Since the OR gate is an extension of the NOR gate followed by an inverter. Therefore, the NOR gate models are used to get the expression of intermediate node transition in the OR gate. At the time instances when intermediate node I of OR gate reaches to $0.9V_{dd}$ and $0.1V_{dd}$ termed as $T_{90}$ and $T_{10}$ (which are TCP_90 and TCP_10 of NOR gate) used to calculate $T_I$. The value of $T_I$ is the difference between $T_{90}$ and $T_{10}$; it works as an input transition time for the second stage inverter in the OR gate.

FIG. 6 depicts an OR gate with input b at 602 and input a at 604, with measurements being estimated at node 606.

Figure 7:
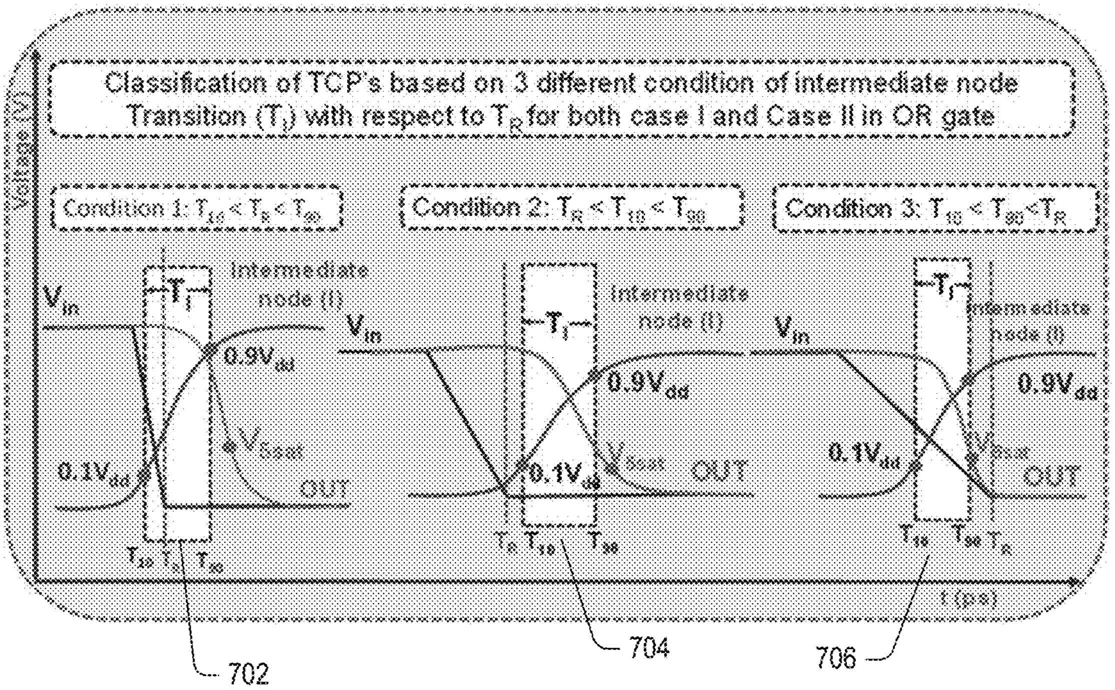
FIG. 7 illustrates an OR gate timing model with node transitions according to one or more embodiments of the present disclosure.

The OR gate models have two different cases:

A. Case I: When an upper transistor (e.g., transistor 601) in series-stack switches or B. Case II: When a lower transistor (e.g., transistor 603) in series-stack switches The intermediate node transition ($T_I$) is first calculated in both cases. Again, based on the condition of $T_I$ with respect to $T_R$, there are three conditions as depicted in FIG. 7:

i. Condition I: $T_{10}<T_R<T_{90}$ (e.g., graph 702)

ii. Condition II: $T_R<T_{10}<T_{90}$ (e.g., graph 704 iii. Condition III: $T_{10}<T_{90}<T_R$ (e.g., graph 706)

Figure 8A:
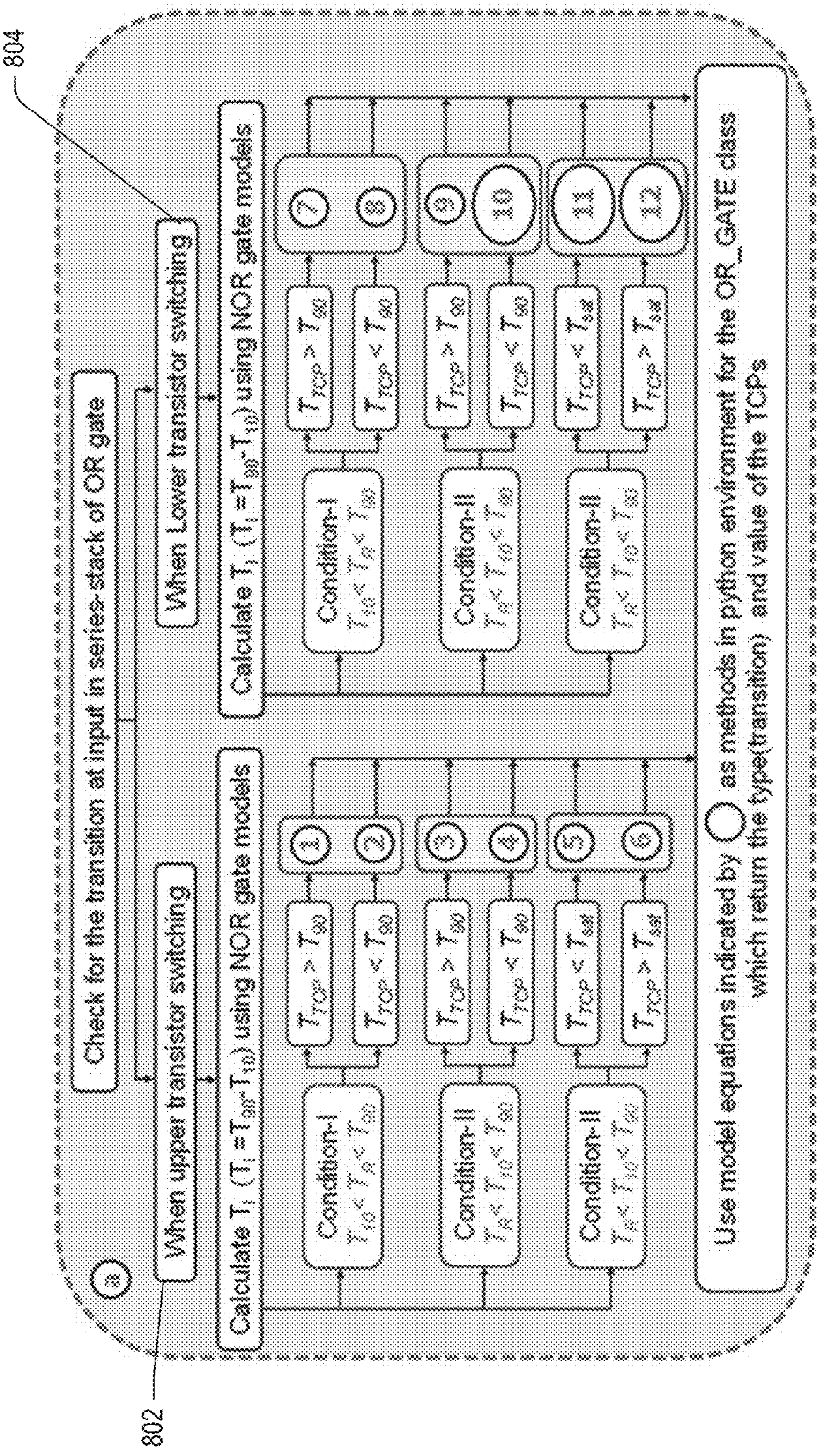
FIG. 8A illustrates OR gate model equations according to one or more embodiments of the present disclosure.
Figure 8B:
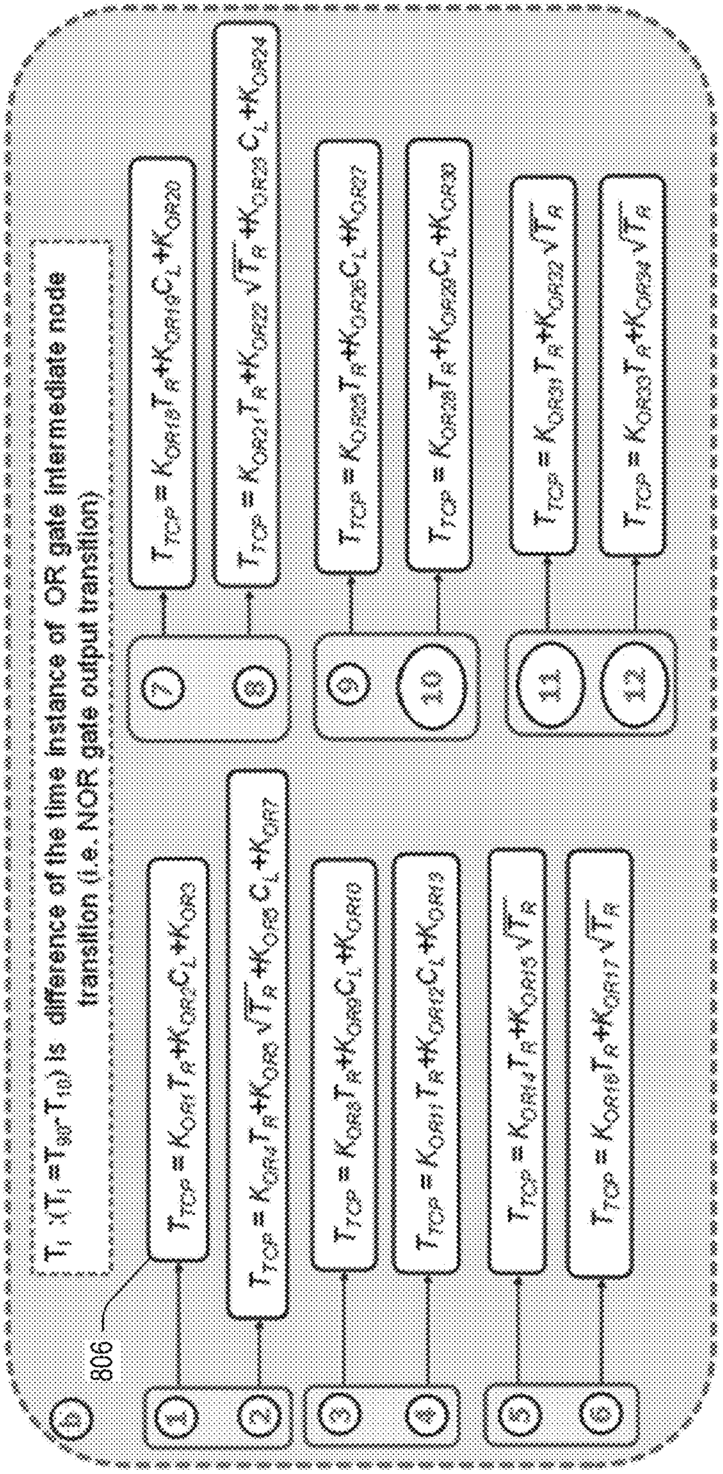
FIG. 8B illustrates OR gate model coefficients according to one or more embodiments of the present disclosure.

Based on the condition of $T_I$ with respect of $T_R$, linear circuit theory is used and terminal transition of second stage inverter in OR gate to calculate overall TCPs of output node discharge of OR gate shown in FIG. 8A that depicts flow chart 802 when the upper transistor 601 switches for the various conditions I, II, and III, and flow chart 804 when the lower transistor 603 switches for conditions I, II, and III.

The model coefficients (e.g., 806) as a function of device/layout level parameters can be extracted by curve fitting of the model equation on SPICE simulation data of an OR gate. The models of the AND gate will be the dual of OR gate. Therefore, case I of the OR gate is case II of the AND gate and vice versa.

Aging mechanism such as NBTI results in a gradual shift in $V_{th}$ of a PMOS device resulting in the degradation of TCPs (delay) values of the standard cells in ECSM.lib file. From analytical timing models of stacked and multistage logic gates (see FIGS. 5A and 5B and 8A and 8B), the model coefficients are a linear function of $V_{th}$. To update TCPs values in the ECSM .lib file with $V_{th}$ degradation owing to NBTI, the next goal is to develop a method for predicting $V_{th}$ degradation under various aging scenarios such as static, dynamic, and asymmetric. According to the literature, $V_{th}$ degradation towards static aging conditions may be expressed as:

$$V_{th|static} = Kt^n + b \quad \text{Eqn. 9}$$

Here, t and n represent the stress time and its time exponent, while K and b are the technology-dependent parameters. The $V_{th}$ degradation into static and dynamic stress conditions may be expressed as shown below:

$$V_{th|dynamic} = \alpha V_{th|static} \quad \text{Eqn. 10}$$

$$V_{th|dynamic} = \alpha(Kt^n + b) \quad \text{Eqn. 11}$$

It is identified from the simulation that the first part of RHS in Eqn. 9 is mainly affected by the α. Therefore, $V_{th}$ in dynamic stress conditions is shown in Eqn. 12 as:

$$V_{th|dynamic} = \alpha Kt^n + b \quad \text{Eqn. 12}$$

As a result, a PDK-specific technique is presented for estimating $V_{th}$ in different stress conditions based on the $V_{th}$ degradation into static and dynamic stress states from Eqn 10 and Eqn. 12, respectively.

To estimate $V_{th}$ in the scenario of static NBTI degradation, a one-time stress simulation on a single PMOS device-based technique for a given PDK (see FIG. 9) can be used. The values of K, n, and b can be extracted by curve fitting of (9) on the results from stress simulation data using the age model from the foundry.

After obtaining n and b values from static stress simulation, a stress simulation is performed on a MOS device with a constant frequency pulse input while changing its α and develop an empirical relation between K and α as shown below:

$$K = \frac{m}{\alpha} + c \quad \text{Eqn. 13}$$

Here m and c represent the slope and intercept part of the linear variation of K with a reciprocal of α. By substituting the value of K from Eqn 13 into Eqn 12, one gets:

$$V_{th|dynamic} = \alpha\left(\frac{m}{\alpha} + c\right)t^n + b. \quad \text{Eqn. 14}$$

Therefore, by extracting m and c values using the linear fit on the variation of K with reciprocal of α, the value of the $V_{th}$ can be estimated in the case of dynamic NBTI.

In the case of stacked and multistage logic (e.g., OR/AND), the value of $\alpha_{eff}$ or α at the intermediate node is different from the applied α at the primary input. In such cases, degradation due to aging in the next stages differs from that in the preceding states, and the value of $\alpha_{eff}$ depends upon the α of the primary input. Such type of aging class is known as asymmetric aging. To get $\alpha_{eff}$ for a path-level circuit, the present disclosure provides a methodology to predict $\alpha_{eff}$ at any intermediate node N-stacked and N-parallel logic in the preceding states. As a result, there are two parts:

1. Prediction of $\alpha_{eff}$ at an intermediate node with N-stacked logic.
2. Prediction of $\alpha_{eff}$ at intermediate node with N-parallel logic To predict the $\alpha_{eff}$ at the intermediate node (P) for the next stage $\alpha_{eff}$ is evaluated for the transistor ($M_1$), which is closely connected to P. The conduction of $M_1$ is fully dependent on the operating state (ON state) of all the transistors ($M_2$, $M_3$, and $M_4$) cascoded on $M_1$. Similarly, the conduction of $M_2$ and $M_3$ are dependent on the ON state of ($M_3$ and $M_4$) and $M_4$, respectively. Whereas the conduction of $M_4$ is independent of all the transistor's operating conditions. Therefore, the $\alpha_{eff}$ of $M_4$, $M_3$, $M_2$, and $M_1$ are $\alpha_{M4\_eff}=\alpha_{M4}$, $\alpha_{M3\_eff}=\max(\alpha_{M4\_eff},\alpha_{M3})$, $\alpha_{M2\_eff}=\max(\alpha_{M3\_eff},\alpha_{M2})$, and $\alpha_{M1\_eff}=\max(\alpha_{M2\_eff},\alpha_{M1})$, respectively.

In the case of N-parallel logic in the preceding stage, to get $\alpha_{eff}$ for the next stage, it is observed that the conduction of all the transistors is independent of each other in parallel logic. Therefore, the $\alpha_{eff}$ of the transistors in N-parallel logic is the same as applied at the primary input side. Again, in the worst-case scenario, the transistor having a minimum value of α will be the $\alpha_{eff}$ for the next stage logic.

In the case of an inverter, if the duty cycle of the input is α, then $\alpha_{eff}$ at the output is 1−α. Therefore, using $\alpha_{eff}$ concept for inverter, stacked and parallel logic, this approach is applied to predict $\alpha_{eff}$ at each intermediate node in a random logic path.

Figure 9:
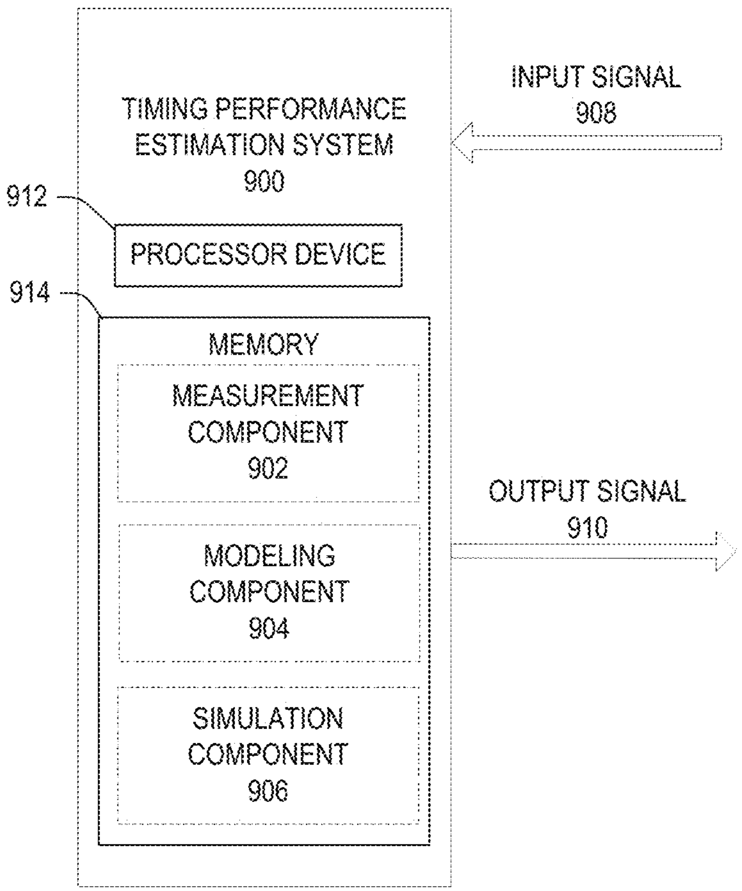
FIG. 9 illustrates a timing performance estimation system according to one or more embodiments of the present disclosure.

FIG. 9 illustrates a timing performance estimation system according to one or more embodiments of the present disclosure.

The timing performance estimation system 900 can include a processor device 912 and a memory 914. The memory 914 can store computer executable instructions or components that can be executed by the processor 912 to perform various operations. For example, the measurement component 902 can measure various values of characteristics such as the voltage or the current of an incoming signal 908 that corresponds to measurements at various nodes at particular times. The incoming signal 908 may also comprise instructions about a digital circuit for which to estimate the timing performance thereof.

The modeling component 904 can determine a timing model for the digital circuit based on initial threshold crossing points for each component in the digital circuit. The modeling component 904 can also determine model coefficients based on curve-fitting the timing model for the digital circuit to simulation data associated with the digital circuit.

A simulation component 906 can estimate aging related threshold voltage degradation based on a stress simulation of the digital circuit and update the model coefficients based on the aging related threshold voltage degradation, wherein the updating the model coefficients results in updated model coefficients. The modeling component 904 can then determine an updated timing model based on the updated model coefficients, wherein the updated timing model includes updated threshold crossing points for each component in the digital circuit. Based on the updated timing model, the timing performance estimation system 900 can perform a signal processing operation based on the updated timing model and generate an output signal 910.

Figure 10:
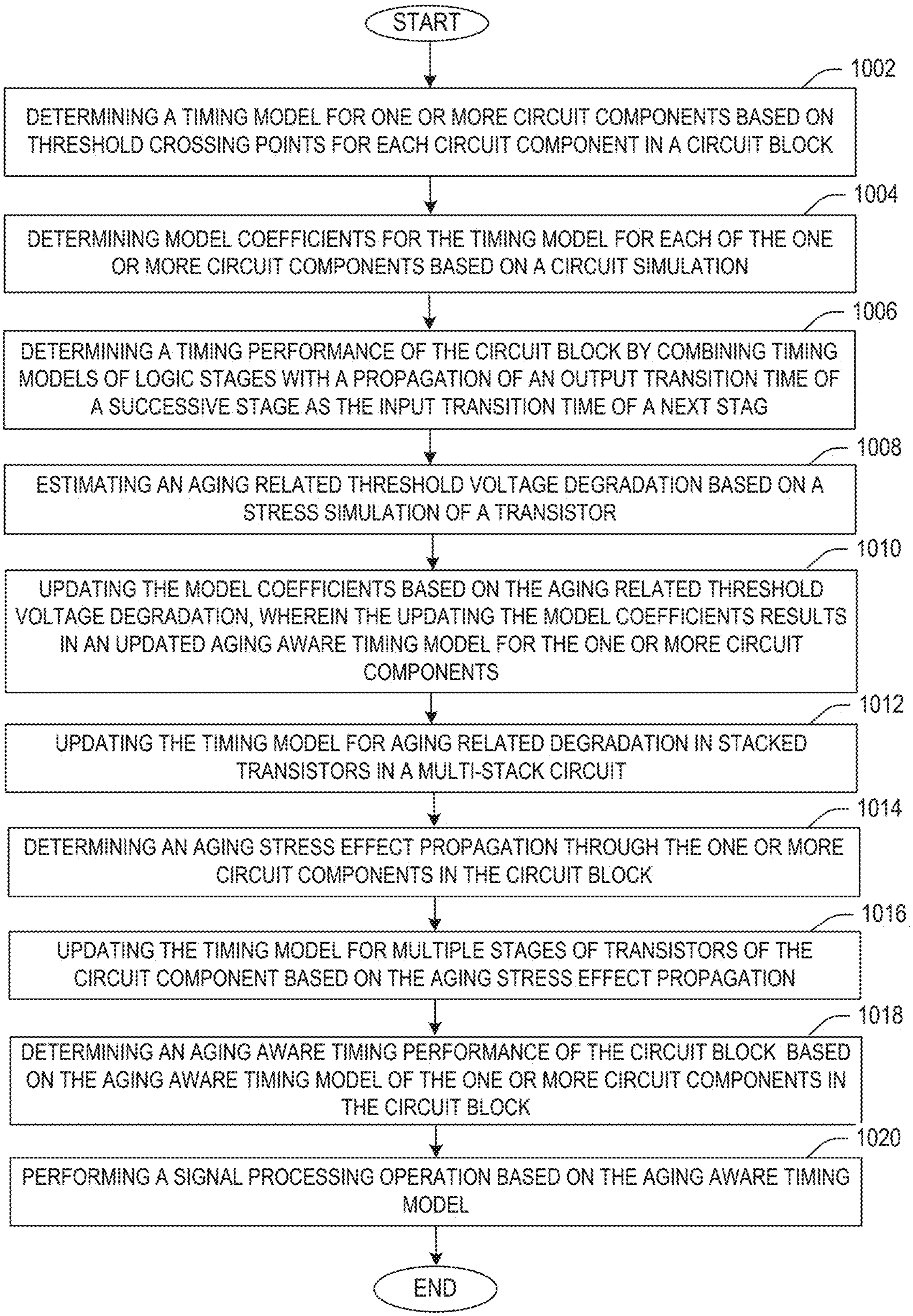
FIG. 10 illustrates a flowchart of a method for estimating timing performance according to one or more embodiments of the present disclosure.

FIG. 10 illustrates a flowchart of a method for estimating timing performance according to one or more embodiments of the present disclosure.

The method can begin at 1002 where the method includes determining a timing model for one or more circuit components based on threshold crossing points for each circuit component in a circuit block.

At 1004, the method includes determining model coefficients for the timing model for each of the one or more circuit components based on a circuit simulation.

At 1006, the method includes determining a timing performance of the circuit block by combining timing models of logic stages with a propagation of an output transition time of a successive stage as the input transition time of a next stage.

At 1008, the method includes estimating an aging related threshold voltage degradation based on a stress simulation of a transistor.

At 1010, the method includes updating the model coefficients based on the aging related threshold voltage degradation, wherein the updating the model coefficients results in an updated aging aware timing model for the one or more circuit components.

At 1012, the method includes updating the timing model for aging related degradation in stacked transistors in a multi-stack circuit.

At 1014, the method includes determining an aging stress effect propagation through the one or more circuit components in the circuit block.

At 1016, the method includes updating the timing model for multiple stages of transistors of the circuit component based on the aging stress effect propagation.

At 1018, the method includes determining an aging aware timing performance of the circuit block based on the aging aware timing model of the one or more circuit components in the circuit block.

At 1020, the method includes performing a signal processing operation based on the aging aware timing model.

In an embodiment, the model coefficients and updated model coefficients are based on a function of a threshold voltage and are associated with the timing performance of the circuit block. In an embodiment, the digital circuit is at least one of a stacked or multi-stage logic cell. In an embodiment, the stacked logic cell comprises at least one of a NOR or NAND gate or the multistage logic cell comprises at least one of an OR, AND, or LATCH cells.

In an embodiment, the determining the timing model for a stacked digital circuit comprises modeling voltage transitions at an input, output and intermediate node transition for a plurality of nodes of the circuit block and determining the coefficients based on the threshold crossing points based on the voltage transitions.

In another embodiment, determining the timing model and the updated timing model for the multi-stage circuit comprises modeling voltage transitions at input, output and intermediate node transitions for a plurality of nodes of the circuit block and determining the coefficients based on the threshold crossing points of the voltage transitions and based on terminal transitions of an inverter in the multi-stage digital cell.

In an embodiment the determining the timing model for the multi-stage digital circuit includes modeling voltage transitions at input, output and intermediate node transitions for a plurality of nodes of the stacked digital circuit; and determining the initial threshold crossing points based on the voltage transitions and based on terminal transitions of an inverter in the multi-stage digital circuit.

In an embodiment, the stress modeling of a circuit comprises a first stress simulation of individual transistors to estimate a threshold voltage change due to static aging and a second stress simulation that estimates a threshold voltage change due to dynamic aging.

In an embodiment, the updated timing model coefficients are determined based on a topology of transistors in the circuit block.

In an embodiment, the updated timing model coefficients are determined based on the stress effect propagation through stages of transistors in the circuit block.

In an embodiment, the updated timing model coefficients are associated with static, dynamic and asymmetric aging in the circuit block.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A method for estimating a timing performance of a circuit block, comprising:

determining a timing model for one or more circuit components based on threshold crossing points for each circuit component in a circuit block;

determining model coefficients for the timing model for each of the one or more circuit components based on a circuit simulation;

determining a timing performance of the circuit block by combining timing models of logic stages with a propagation of an output transition time of a successive stage as the input transition time of a next stage;

estimating an aging related threshold voltage degradation based on a stress simulation of a transistor;

updating the model coefficients based on the aging related threshold voltage degradation, wherein the updating the model coefficients results in an updated aging aware timing model for the one or more circuit components;

updating the timing model for aging related degradation in stacked transistors in a multi-stack circuit;

determining an aging stress effect propagation through the one or more circuit components in the circuit block;

updating the timing model for multiple stages of transistors of the circuit component based on the aging stress effect propagation;

determining an aging aware timing performance of the circuit block based on the aging aware timing model of the one or more circuit components in the circuit block; and performing a signal processing operation based on the aging aware timing model.

2. The method of claim 1, wherein the model coefficients and updated model coefficients are based on a function of a threshold voltage and are associated with the timing performance of the circuit block.

3. The method of claim 1, wherein the circuit block is at least one of a stacked or multi-stage logic cell.

4. The method of claim 3, wherein determining the timing model and the updated aging aware timing model for the circuit block comprises:

modeling voltage transitions at an input, output and intermediate node transition for a plurality of nodes of the circuit block; and determining the coefficients based on the threshold crossing points based on the voltage transitions.

5. The method of claim 3, wherein determining the timing model and the updated aging aware timing model for the multi-stage circuit comprises:

modeling voltage transitions at input, output and intermediate node transitions for a plurality of nodes of the circuit block; and determining the coefficients based on the threshold crossing points of the voltage transitions and based on terminal transitions of an inverter in the multi-stage digital cell.

6. The method of claim 3, wherein the stacked logic cell comprises at least one of a NOR or NAND gate.

7. The method of claim 3, wherein the multistage logic cell comprises at least one of an OR, AND, or LATCH cells.

8. The method of claim 1, wherein a stress modeling of a circuit comprises a first stress simulation of individual transistors to estimate a threshold voltage change due to static aging and a second stress simulation that estimates a threshold voltage change due to dynamic aging.

9. The method of claim 1, wherein the updated aging aware timing model coefficients are determined based on a topology of transistors in the circuit block.

10. The method of claim 1, wherein the updated aging aware timing model coefficients are determined based on the stress effect propagation through stages of transistors in the circuit block.

11. The method of claim 1 wherein the updated aging aware timing model coefficients are associated with static, dynamic and asymmetric aging in the circuit block.

12. A system for estimating a timing performance of a circuit block, comprising:

a memory that comprises computer-executable instructions;

a processor that executes the computer-executable instructions to perform operations, comprising:

determining a timing model for one or more circuit components based on threshold crossing points for each circuit component in a circuit block;

determining model coefficients for the timing model for each of the one or more circuit components based on a circuit simulation;

determining a timing performance of the circuit block by combining timing models of logic stages with a propagation of an output transition time of a successive stage as the input transition time of a next stage;

estimating an aging related threshold voltage degradation based on a stress simulation of a transistor;

updating the model coefficients based on the aging related threshold voltage degradation, wherein the updating the model coefficients results in an updated aging aware timing model for the one or more circuit components;

updating the timing model for aging related degradation in stacked transistors in a multi-stack circuit;

determining an aging stress effect propagation through the one or more circuit components in the circuit block;

updating the timing model for multiple stages of transistors of the circuit component based on the aging stress effect propagation;

determining an aging aware timing performance of the circuit block based on the aging aware timing model of the one or more circuit components in the circuit block; and performing a signal processing operation based on the aging aware timing model.

13. The system of claim 12, wherein the model coefficients and updated model coefficients are based on a function of a threshold voltage and are associated with the timing performance of the circuit block.

14. The system of claim 12, wherein the circuit block is at least one of a stacked or multi-stage logic cell.

15. The system of claim 14, wherein determining the timing model and the updated aging aware timing model for the circuit block comprises:

modeling voltage transitions at an input, output and intermediate node transition for a plurality of nodes of the circuit block; and determining the coefficients based on the threshold crossing points based on the voltage transitions.

16. The system of claim 14, wherein determining the timing model and the updated aging aware timing model for the multi-stage circuit comprises:

modeling voltage transitions at input, output and intermediate node transitions for a plurality of nodes of the circuit block; and determining the coefficients based on the threshold crossing points of the voltage transitions and based on terminal transitions of an inverter in the multi-stage digital cell.

17. The system of claim 14, wherein the stacked logic cell comprises at least one of a NOR or NAND gate.

18. The system of claim 14, wherein the multistage logic cell comprises at least one of an OR, AND, or LATCH cells.

19. The system of claim 12, wherein a stress modeling of a circuit comprises a first stress simulation of individual transistors to estimate a threshold voltage change due to static aging and a second stress simulation that estimates a threshold voltage change due to dynamic aging.

20. The system of claim 12, wherein the updated timing model coefficients are determined based on a topology of transistors in the circuit block.

* * * * *